United States Patent [19]
Krimmer et al.

[11] Patent Number: 5,809,977
[45] Date of Patent: Sep. 22, 1998

[54] VALVE FOR METERED INTRODUCTION OF VOLATILIZED FUEL

[75] Inventors: Erwin Krimmer, Pluderhausen; Wolfgang Schulz, Bietigheim-Bissingen; Tilman Miehle, Kernen; Manfred Zimmermann, Bad Rappenau, all of Germany

[73] Assignee: Robert Bosch GmbH, Stuttgart, Germany

[21] Appl. No.: 765,132
[22] PCT Filed: Feb. 28, 1996
[86] PCT No.: PCT/DE96/00326
§ 371 Date: Jan. 2, 1997
§ 102(e) Date: Jan. 2, 1997
[87] PCT Pub. No.: WO96/35052
PCT Pub. Date: Nov. 7, 1996

[30] Foreign Application Priority Data
May 5, 1995 [DE] Germany ............ 195 16 545.4

[51] Int. Cl.⁶ ............ F02M 37/04; B01D 15/00
[52] U.S. Cl. ............ 123/516; 137/550
[58] Field of Search ............ 137/550; 123/516, 123/518, 519, 520

[56] References Cited

U.S. PATENT DOCUMENTS

| | | |
|---|---|---|
| 1,920,925 | 8/1933 | Juchheim et al. . |
| 4,543,983 | 10/1985 | Pauliukonis ............ 137/550 |
| 5,024,254 | 6/1991 | Yamagiwa ............ 137/550 |
| 5,150,879 | 9/1992 | Mullally ............ 251/129.21 |
| 5,178,116 | 1/1993 | Fehrenbach et al. ............ 123/520 |
| 5,183,022 | 2/1993 | Cook ............ 123/516 |
| 5,429,099 | 7/1995 | Deland ............ 123/516 |
| 5,501,198 | 3/1996 | Koyama ............ 123/520 |

*Primary Examiner*—Thomas N. Moulis
*Attorney, Agent, or Firm*—Edwin E. Greigg; Ronald E. Greigg

[57] ABSTRACT

A valve which has a dirt filter that is accommodated in a chamber between an electromagnet valve and an inflow adapter in a valve housing. The valve is suitable for metered introduction of volatilized fuel from a fuel tank into an intake tube of a mixture-compressing internal combustion engine with externally supplied ignition.

8 Claims, 3 Drawing Sheets

VALVE FOR METERED INTRODUCTION OF VOLATILIZED FUEL

PRIOR ART

The invention is based on a valve for metered introduction of volatilized fuel from a fuel tank of an internal combustion engine into an intake tube of the engine.

Such a valve is already known (German Patent Disclosure DE-OS 40 23 044), to which fuel is supplied via an inflow adapter in order subsequently to feed this fuel in metered fashion into the intake tube via an outflow adapter provided on the valve. The inflow adapter of the valve communicates, for instance via a hose, with an adsorption filter which temporarily stores the volatilized fuel vapors from the fuel tank and supplies them to the valve via the hose. The danger is that dirt in the fuel, for instance from the adsorption filter, can get into the interior of the valve and impair proper function of the valve and hence operating safety. To avoid this, dirt filters are built in, for instance in the hose between the adsorption filter and the valve or in the inflow adapter of the valve. The hose or the inflow adapter of the valve, however, has only a small flow cross section, so that the dirt filter can likewise have only a small flow cross section. Such dirt filters can become relatively rapidly plugged by the dirt in the fuel, however, resulting in increased flow resistance at the dirt filter, which causes a pressure loss and hence a reduction in the throughput of the valve.

ADVANTAGES OF THE INVENTION

The valve according to the invention has an advantage over the prior art that the valve has proper function and high operating safety over the intended service life. This is advantageously possible with a dirt filter that causes only an extremely slight pressure loss over the intended service life, so that a reduction in the throughput of the valve can be averted. It is especially advantageous that the dirt filter provided for this purpose can be built into the valve in a simple way, so that the dirt filter adds only slightly to the production cost of the valve. It is also advantageous that the dirt filter does not hinder an operation of adjusting the throughput of the valve, and thus it can be installed in already known valves, without requiring major structural changes.

By the provisions recited herein advantageous further features of and improvements to the valve are possible.

BRIEF DESCRIPTION OF THE DRAWING

One exemplary embodiment is shown in the drawing in simplified form and described in further detail below.

DESCRIPTION OF THE EXEMPLARY EMBODIMENT

Figure 1:
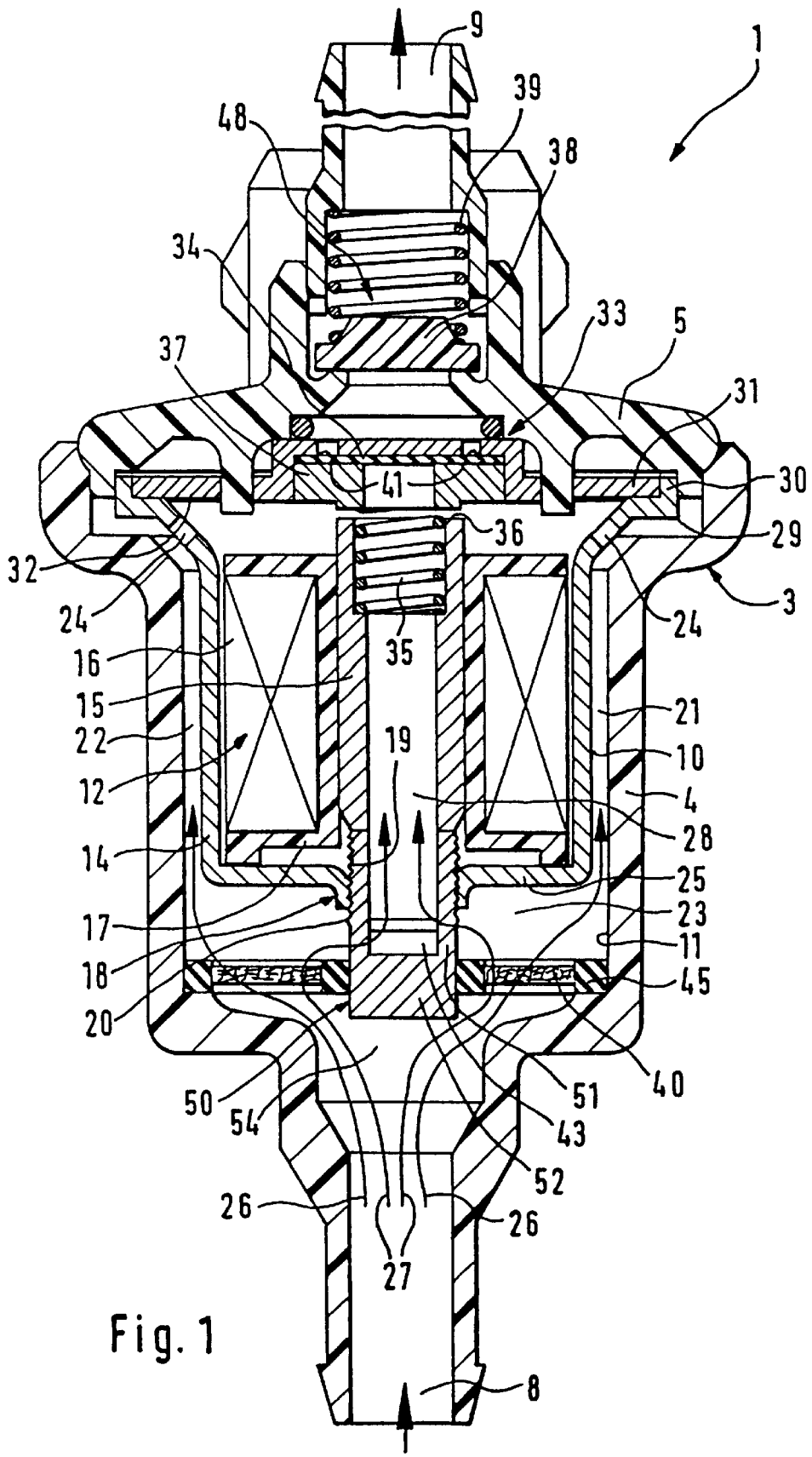
FIG. 1 is a longitudinal section through a valve embodied according to the invention.

The valve 1 schematically shown in longitudinal section in FIG. 1 serves the purpose of metered introduction of volatilized fuel from a fuel tank of an internal combustion engine into an engine intake tube; it is part of a fuel vapor trapping system, not shown in further detail, of an internal combustion engine. The structure and function of such fuel vapor trapping systems can be learned for instance from Bosch Technische Unterrichtung, Motor Management Motronic [Bosch Technical Instruction, Motronic Motor Management], Second Edition, August 1993, pp. 48 and 49. The structure and mode of operation of such a valve 1, also known as a regeneration valve or tank vent valve, is also known to one skilled in the art from German Patent Disclosure DE-OS 40 23 044, which is hereby incorporated by reference into the present patent application.

The valve has a two part valve housing 3, with a cup-shaped housing part 4 and a cap-shaped housing part 5. The cap-shaped housing part 5 can be placed on the cup-shaped housing part 4 and closes the latter off. The cup-shaped housing part 4 carries an inflow adapter 8 for connection to a vent adapter of the fuel tank or to an adsorption filter downstream thereof. The adsorption filter is filled with a storage medium for fuel, such as activated charcoal, and serves the purpose of temporarily storing fuel vapor volatilized from the fuel tank. The cap-shaped housing part 5 has an outflow adapter 9 for connection to the intake tube of the engine. The inflow adapter 8 and the outflow adapter 9 are each disposed axially aligned in the respective housing parts 4 and 5. An electromagnet 12 is disposed in the interior of the cup-shaped housing part 4. It has a cup-shaped magnet housing 14, with a coaxial hollow-cylindrical magnet core 15, that penetrates a bottom 25 of the magnet housing 14, and a cylindrical exciter coil 16, which is seated on a coil carrier 17 and rests in the magnet housing 14, surrounding the magnet core 15. An outward-protruding threaded adapter 18 with an internal thread 19 is embodied integrally with the bottom 25 of the magnet housing 14, and an externally threaded portion 20 of the hollow-cylindrical magnet core 15 is screwed into the threaded adapter 18.

By rotation of the magnet core 15, this armature can be axially displaced in the magnet housing 14. The magnet core 15 is aligned with the inflow adapter 8, so that fuel vapor can flow in an axial through opening 28 defined by the hollow magnet core 15. The magnet housing 14 with the magnet core 15 is inserted into the cup-shaped housing part 4 in such a way that axial conduits 21, 22 remain between the outer jacket 10 of the magnet housing 14 and an inner wall 11 of the housing part 4; these conduits are offset from one another by the same angles in the same circumferential direction. In the longitudinal section of FIG. 1, only the two diametrically opposed axial conduits 21, 22 can be seen. The axial conduits 21, 22 communicate with the inflow adapter 8 via an annular chamber 23, which remains in the valve housing 3 between the bottom 25 of the magnet housing 14, an end region 50 of the magnet core 15 protrudes from the threaded adapter 18 and has an externally threaded portion 20, and a housing bottom of the cup-shaped housing part 4. On the other hand, via bores 24 that are made in the magnet housing 14 near the open end of the magnet housing 14, the axial conduits 21, 22 communicate with the interior of the magnet housing 14. Through these axial conduits 21, 22, the fuel vapor entering from the inflow adapter 8 also flows around the magnet housing 14 and dissipates heat that has been created. The flow direction of the fuel vapor in the axial conduits 21, 22 is represented by corresponding arrows 26 in FIG. 1. In FIG. 1, the flow direction of the fuel vapor flowing from the inflow adapter 8 into the hollow magnet core 15 is also indicated by corresponding arrows 27.

The rim of the magnet housing 14 is bent outward at an angle from an annular bearing flange 29 that is bent over on its end to form an axially protruding annular rib 30. The bearing flange 29 serves to receive a magnetic return yoke 31, which covers the magnet housing 14 and rests peripherally on the annular rib 30.

The structure and function of such a magnetic return yoke 31 is known to one skilled in the art from German Patent Disclosure DE-OS 40 23 044 and will therefore not be described further here. Between the bearing flange 29 and the magnetic return yoke 31, a leaf spring 32 of nonmagnetic material, such as bronze, is also fastened, carrying the armature of the electromagnet 12.

The electromagnet 12 serves the purpose of pulsed switching of a seat valve 33, which for example has a double valve seat 41. Cooperating with the double valve seat 41 is a valve member in the form of an annular disk 37 of magnetic material, which at the same time forms the armature of the electromagnet 12. The annular disk 37 has a rubber seal 34, on its side toward the double valve seat 41, which when the seat valve 33 is closed, the rubber seal 34 is pressed by the valve closing spring 35 against the double valve seat 41. The free face end of the magnet core 15 forms a stop 36 for the reciprocating motion of the annular disk 37. By means of the adjusting thread, formed by the internal thread 19 and externally threaded portion 20, the stop 36 can be axially displaced, and the throughput when the seat valve 33 is maximally open can thus be defined. The valve closing spring 35 is sized small, since if there is a pressure drop between the outflow adapter 9 and the inflow adapter 8, suction is exerted on the annular disk 37 in the direction of valve closure; in other words, the closing action of the valve spring 35 is reinforced. The outflow adapter 9 is accommodated, for instance by a detent connection, in the cap-shaped housing part 5. A check valve 48, which opens in the direction of the intake tube and has a valve body 38 and a valve spring 39, is provided in the outflow adapter 9.

When the electromagnet 12 is currentless, the seat valve 33 is closed, since the annular disk 37 is pressed with its rubber seal 34 against the double valve seat 41 by the valve closing spring 35 in operation of the engine, the electromagnet 12 is triggered in pulsed fashion by an electronic control unit. The pulse train frequency is specified by the operating state of the engine, and thus the throughput of volatilized fuel passing via the seat valve 33 from the inflow adapter 8 into the outflow adapter 9 can be metered accordingly.

Figure 2:
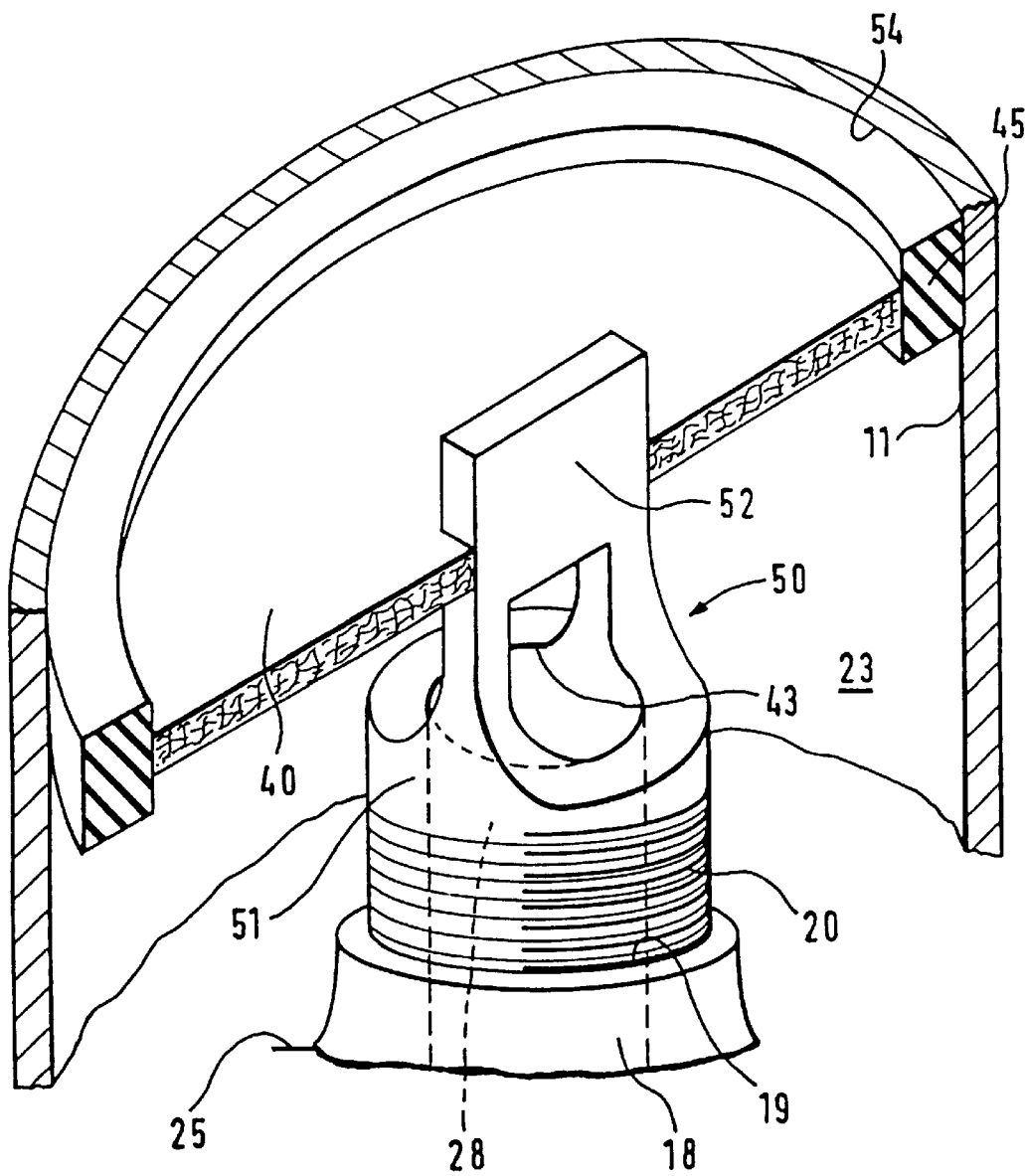
FIG. 2 shows a partial detail of the valve in perspective which illustrates a filter with the parts rotated 180 degrees from that shown in FIG. 1.
Figure 3A:
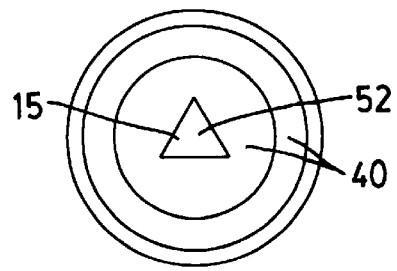
FIGS. 3a–d illustrate different shapes for the end region of the magnet core.
Figure 3B:
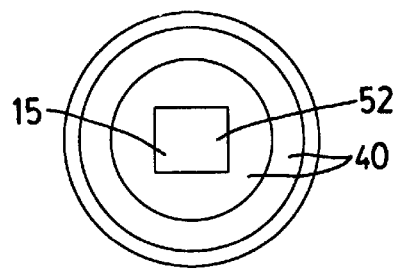
Figure 3C:
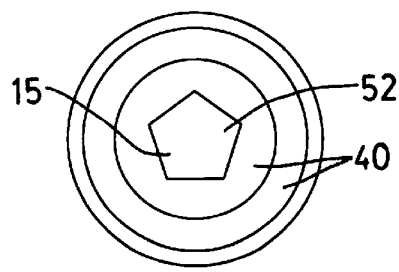
Figure 3D:
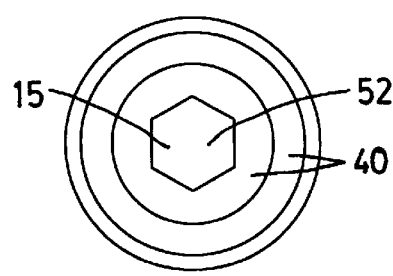

According to the invention, a dirt filter 40 is provided between the threaded adapter 18 of the electromagnet valve 12 and the inflow adapter 8; it is mounted in a manner fixed against relative rotation on the end region 50 of the hollow-cylindrical magnet core 15, which region protrudes from the bottom 25 of the magnet housing 14 or threaded adapter 18. As shown in FIG. 2, which is a detail in perspective of the dirt filter 40 and the end region 50 of the magnet core 15, the end region 50 to that end takes the form of a helical blade, for instance, which is composed in one piece of a cylindrical part 51 and a narrow, blocklike, shallow end part 52. The blocklike end part 52 penetrates the dirt filter 40, in the installed state of the dirt filter 40, so that the end part 52 is closer to the inflow adapter 8. The dirt filter 40 is retained as tightly as possible against the blocklike end part 52 in its center, for instance by pressure or adhesive bonding.

The blocklike end part 52 also has a radial opening 43, passing through its two largest faces, which in the installed state of the dirt filter 40 is located on a side of the dirt filter 40 remote from the inflow adapter 8. The opening 43 changes over into the through opening 28, shown in dashed lines in FIG. 2, in the hollow magnet core 15, so that a fluid connection is established from the opening 43 to the through opening 28. The fuel vapor flowing from the inflow adapter 8 in the direction of the arrows 27 first flows through the dirt filter 40 and is thereby cleaned of dirt, and then flows on via the opening 43 in the blocklike end part 52 into the through opening 28 of the magnet core 15 to the seat valves 33.

The dirt filter 40 has a disklike shape and radially fills the annular chamber 23, so that this chamber has a considerably larger flow cross section than the flow cross section of the inflow adapter 8. Such a large flow cross section produces only slight flow resistance in the flow of fuel vapor and results in only an extremely slight pressure loss at the dirt filter 40, and as a result a reduction in the throughput of the valve 1 during the intended service life can be precluded. To filter out the dirt, the dirt filter 40 has a cloth, for instance, with mesh sizes of a few micrometers. The dirt filter 40 may also have a resilient sealing lip 45 in its outer region, for instance, which is pressed against the inner wall 11 of the housing part 4. The dirt filter 40 seals off the annular chamber 23, between the dirt filter 40 and the bottom 25 of the magnet housing 14, from a chamber 54 remaining between the dirt filter 40 and the inflow adapter 8, so that no dirt can get past the dirt filter 40. As shown in FIG. 1, the fuel vapor passes from the inflow adapter 8 into the chamber 54 and from there through the dirt filter 40 into the downstream portion of the annular chamber 43, after which the flow of fuel vapor splits, so that one portion flows in the direction of the arrows 27 via the opening 43 of the blocklike end portion 52 in the magnet core 15 and one part flows in the direction of the arrows 26 into the axial conduits 21, 22 to the seat valve 33.

The dirt filter 40 is mounted in a manner fixed against relative rotation on the end part 52 of the magnet core 15, so as to enable an adjustment of the stroke of the annular disk 37 and thus the throughput of the valve 1 by rotating the magnet core 15 without dismantling the valve 1. This is possible by means of a tool that is introduced into the inflow adapter 8 so that it can rotate the magnet core 15 by engaging the blocklike end part 52. When the magnet core 15 rotates, the dirt filter 40 rotates accordingly with it, thus following along with the axial displacement of the magnet core 15 in the threaded adapter 18; the sealing lip 45 remains tightly against the inner wall 11 of the housing part 4.

The invention is not limited to the exemplary embodiment described. The end region 50 or end part 52 of the magnet core 15 may for instance also have a different form. For instance, the end region 50 or end part 52 may take the form of a triangle, square, pentagon, or hexagon, or in other words a polygon or the like, as shown in FIGS. 3a–d, in order to secure the dirt filter 40 to the end part 52 and to allow rotating the magnet core 15 by means of the tool.

The foregoing relates to preferred exemplary embodiments of the invention, it being understood that other variants and embodiments thereof are possible within the spirit and scope of the invention, the latter being defined by the appended claims.

What is claimed is:

1. A valve for introduction of metered volatilized fuel from a fuel tank of an internal combustion engine into an intake tube of the engine, comprising a valve housing having a longitudinal axis, said valve housing has an inflow adapter for connection to a vent adapter of the fuel tank or to an adsorption filter downstream of the inflow adapter for the volatilized fuel, and an outflow adapter for connection to an intake tube of the engine, a seat valve provided in the interior of the valve housing between the outflow adapter and the inflow adapter, said seat valve is actuatable by an electromagnet that has a hollow magnet core (15), a dirt filter (40)

is mounted in a chamber (23, 54) in the valve housing (3) between the electromagnet (12) and the inflow adapter (8) in a manner fixed against relative rotation on an end region (50) of the hollow magnet core (15) oriented toward the inflow adapter (8) in such a way that the fuel vapor flowing in from the inflow adapter (8) flows through the dirt filter (40) and only after that reaches the seat valve (37, 41).

2. A valve in accordance with claim 1, in which the end region (50) of the hollow magnet core (15) has a radial opening (43), which in an installed state of the dirt filter (40) is located on a side of the dirt filter (40) remote from the inflow adapter (8).

3. A valve in accordance with claim 1, in which the end region (50) of the magnet core (15) takes the form of a helical blade.

4. A valve in accordance with claim 1, in which the end region (50) of the magnet core (15) is selected from a group consisting of a triangle, square, pentagons, hexagon or polygon.

5. A valve in accordance with claim 1, in which the dirt filter (40) is disklike in embodiment and rests displaceably on an inner wall (11) of the valve housing (3).

6. A valve in accordance with claim 5, in which the dirt filter (40) comprises a mesh type of cloth that has a mesh size of a few micrometers.

7. A valve in accordance with claim 5, in which the dirt filter (40) has a sealing lip (45), which rests on an inner wall (11) of the valve housing (3).

8. A valve in accordance with claim 1, in which the dirt filter (40) is mounted by pressure on the end region (50) of the magnet core (15).

\* \* \* \* \*